(12) United States Patent
Adler et al.

(10) Patent No.: US 7,869,436 B1
(45) Date of Patent: Jan. 11, 2011

(54) METHODS AND APPARATUS FOR CONNECTING TO VIRTUAL NETWORKS USING NON SUPPLICANT AUTHENTICATION

(75) Inventors: Saul Adler, West Hempstead, NY (US); James N. Guichard, Groton, MA (US); Luca Martini, Denver, CO (US); Venkateswara Rao Yarlagadda, Bangalore (IN); W. Scott Wainner, Potomac Falls, VA (US)

(73) Assignee: Cisco Technology, Inc., San Jose, CA (US)

( * ) Notice: Subject to any disclaimer, the term of this patent is extended or adjusted under 35 U.S.C. 154(b) by 1490 days.

(21) Appl. No.: 11/250,010

(22) Filed: Oct. 13, 2005

(51) Int. Cl.
H04L 12/28 (2006.01)
(52) U.S. Cl. ....................... 370/392; 370/351
(58) Field of Classification Search ........... None
See application file for complete search history.

(56) References Cited

U.S. PATENT DOCUMENTS

| | | | | |
|---|---|---|---|---|
| 6,526,052 B1 * | 2/2003 | Rijhsinghani et al. | | 370/389 |
| 6,570,875 B1 * | 5/2003 | Hegde | | 370/389 |
| 6,693,878 B1 * | 2/2004 | Daruwalla et al. | | 370/235 |
| 6,701,437 B1 * | 3/2004 | Hoke et al. | | 726/15 |
| 6,912,592 B2 * | 6/2005 | Yip | | 709/249 |
| 7,023,846 B1 * | 4/2006 | Andersson et al. | | 370/389 |
| 7,106,747 B2 * | 9/2006 | Donaghey | | 370/395.52 |
| 7,227,859 B1 * | 6/2007 | Finn et al. | | 370/354 |
| 7,376,743 B1 * | 5/2008 | Bazzinotti et al. | | 709/229 |
| 7,450,598 B2 * | 11/2008 | Chen et al. | | 370/409 |
| 7,568,107 B1 * | 7/2009 | Rathi et al. | | 713/182 |
| 7,689,722 B1 * | 3/2010 | Timms et al. | | 709/249 |
| 2002/0002621 A1 * | 1/2002 | Zhang et al. | | 709/238 |
| 2002/0186698 A1 * | 12/2002 | Ceniza | | 370/401 |
| 2003/0105872 A1 * | 6/2003 | Han et al. | | 709/229 |
| 2003/0131131 A1 * | 7/2003 | Yamada et al. | | 709/238 |
| 2003/0235191 A1 * | 12/2003 | Heggarty et al. | | 370/389 |
| 2005/0066035 A1 * | 3/2005 | Williams et al. | | 709/226 |
| 2006/0259768 A1 * | 11/2006 | Chow | | 713/168 |
| 2008/0162726 A1 * | 7/2008 | Hoover et al. | | 709/245 |
| 2009/0067442 A1 * | 3/2009 | Killian | | 370/401 |
| 2010/0121943 A1 * | 5/2010 | Hoover et al. | | 709/219 |

OTHER PUBLICATIONS

"Cisco TrustSec: Enabling Switch Security Services", available at https://www.cisco.com/en/US/solutions/collateral/ns340/ns394/ns147/ns774/net_implementation_white_paper0900aecd80716abd.html on Jul. 24, 2009.

"Cisco TrustSec: Enabling Switch Security Services", available for download at https://www.cisco.com/en/US/solutions/collateral/ns340/ns394/ns147/ns774/net_implementation_white_paper0900aecd80716abd.html on Jul. 24, 2009.

* cited by examiner

*Primary Examiner*—Phirin Sam
(74) *Attorney, Agent, or Firm*—Brinks Hofer Gilson and Lione

(57) ABSTRACT

A system allows a device to communicate using a virtual network the method by assigning a network address to the device. The network address is selected from a plurality of network addresses that can be assigned to any of a plurality of virtual networks. The system receives a request to authenticate the device, and then determines a virtual network on which to assign the device. The virtual network is selected from the plurality of virtual networks. The system identifies the device as authenticated based on the assigning of the network address and the virtual network.

33 Claims, 9 Drawing Sheets

METHODS AND APPARATUS FOR CONNECTING TO VIRTUAL NETWORKS USING NON SUPPLICANT AUTHENTICATION

BACKGROUND

Conventional technologies for virtual networks, such as a virtual local area network (VLAN) operate by connecting devices (i.e., servers, workstations, etc) to create a network that is logically segmented on an organizational basis (i.e., project teams, geographical locations, college campuses, etc). Traffic traveling through a particular VLAN carries a unique virtual network identifier (such as a VLAN ID) as it traverses through the network. The VLAN ID allows VLAN switches and routers to selectively forward packets to ports with the same VLAN ID while disallowing traffic from one VLAN to be sent to devices on another VLAN.

The devices within a VLAN can be connected to the same VLAN, regardless of their physical connections to the network. A device within the VLAN can be physically moved without having to manually update the network address of that device. Reconfiguration of the network can be done through software rather than by physically unplugging and moving devices or wires.

When an end user device such as a workstation is added to a network device such as an Ethernet switch that is shared by more than one VLAN, the end user device has to be statically or dynamically assigned to a VLAN. If this is done dynamically, authentication of the end user is required to know which VLAN to assign the end user device to. One authentication method commonly used for wired and wireless networking, is 802.1x. The authentication process is often performed prior to an IP address being assigned to the end user's device. The end user device being authenticated is called a supplicant where the network device that challenges the end user device for credentials is called the Authenticator. The Authenticator passes the credentials obtained from the end user device to the Authentication Server. The Authentication Server authenticates the end user using the credentials. Once authenticated, the new device is added to the VLAN, and then assigned a network address.

Routers support Virtual Routing and Forwarding instances (VRFs). A VRF consists of a network address routing table, a derived forwarding table, a set of interfaces or VLANs that use the forwarding table, and a set of rules and routing protocols that determine what goes into the forwarding table.

SUMMARY

Conventional technologies for authenticating devices attempting to connect to a virtual network suffer from a variety of deficiencies. In particular, conventional technologies for authenticating devices attempting to connect to a virtual network are limited in that the end user device must first be placed on a VLAN and obtain an IP address prior to authenticating the end user using HTTP/Web Portal based. The Virtual Network the end user device is connected to prior to authentication might have to be changed, as a result of the authentication process, The virtual network to which the authenticating device will be granted access to cannot be determined until after the IP based authentication process (e.g., a HTTP Web portal) is completed. Therefore, during HTTP authentication, the authenticating device is first assigned a network address that may not necessarily be a network address belonging to a virtual network for which the authenticating device will be granted access, and a new network address must be re-assigned after the IP based t authentication has been completed. Reassignment of network addresses is cumbersome and technically challenging.

Embodiments disclosed herein significantly overcome such deficiencies and provide a system that includes a virtual network assigner that allows a device such as a client device to communicate using an appropriate virtual network for that device. The system also includes a packet director such as a switch or router that directs a packet along the correct virtual network to which the packet has been assigned by the virtual network assigner. In the embodiments disclosed herein, a set of two or more VLANs share a pool of commonly usable addresses that individually can, at any point in time, each be exclusively assigned to one VLAN of the set at that time (while not being assigned to another VLAN). Thus the system disclosed herein may assign an address from the pool to one VLAN at one time, and later that same address may be assigned for use in another VLAN and would not be usable in the first VLAN (or others other than the one to which it is assigned).

Using this technique, a client device requiring access to the network can first be assigned an address from the commonly shared pool of VLAN addresses, any of which would be usable on any one of the VLANs. Then, authentication of the client device can be performed, such as by using HTTP authentication (that first required an address to be assigned to the client, which in this case it has). As a result of the authentication process, an appropriate VLAN is identified and the assigned address (from the shared pool of VLAN addresses) that was given to the client device prior to authentication is now assigned to be exclusive to the particular VLAN that is indicated by the authentication level. The client device is thus given a VLAN ID of one VLAN to which it is now assigned using that address. As traffic from the client device moves into the network, the packets from the client contain the source address assigned to the client (i.e., from the shared pool) and the VLAN ID of the VLAN to which that client device (and hence the address) is assigned (as obtained during authentication).

Each router in the network that supports the set of VLANS can maintain separate respective VRF information (e.g. a routing table for addresses exclusive to that VLAN) for each particular VLAN in the set of VLANS. The Pool of IP addresses that is shared across multiple VLANs and associated VRFs in the router is pre-configured on the router supporting the multiple VRFs. In a typical VRF based network there can be overlapping IP addresses but no shared services. Other embodiments as will be explained overcome issues of shared servers that multiple VLANs or VRFs share when using a shared pool of commonly usable addresses.

In operation of one configuration, the virtual network assigner such as a switch or VPN device assigns a network address to a device such as a client device. The network address is selected from a group of network addresses that can be assigned to any virtual network within a group of virtual networks (but only one at any given time). The virtual network assigner receives a request to authenticate the device. In an example configuration, the virtual network assigner performs an HTTP authentication to determine the access level for the device at which the device is authorized to communicate on the virtual network. The virtual network assigner determines the appropriate virtual network for the device (e.g., based on the access level), and then assigns the device to that virtual network. Using this technique, the network address is assigned first, then the appropriate virtual network for that device is chosen, and the assigned network address is associated with the chosen virtual network. The network address is chosen from a pool of network addresses that are available to a group of virtual networks. Thus, by assigning the network address first, HTTP authentication can be used to authenticate the device, yet that same network address can be used for the chosen virtual network because all the network addresses within the pool of network addresses are available to or shared between any virtual network within the group of virtual networks.

As the device begins to transmit packets onto the network, each packet will contain the source address of the device that was provided just prior to authentication (the address chosen form the pool of shared VLAN addresses) and the VLAN ID assigned to that device. A packet director such as a router detects a first packet coming from a client. The packet director identifies the first packet as being assigned to a first virtual network (e.g. via the VLAN ID), and assigns the addressing information of the first packet to routing information (e.g. VRF data) associated with the first virtual network. In an example configuration, the addressing information is a virtual network identifier (such as a VLAN ID) and the routing information is a VRF table associated with the first virtual network. The packet director routes the first packet (and subsequent packets, each having the same addressing and VLAN ID information of the first packet) using the routing information (i.e., the VRF table) associated with the first virtual network. The VRF data for the VLANs is distributed to other routers in the network using known routing table distribution techniques.

Continuing with the example configuration, the packet director detects a second packet coming from a client. The packet director identifies the second packet as being assigned to a second virtual network, and assigns the addressing information of the second packet to routing information associated with the second virtual network. In other words, the addressing information of the first packet is assigned to routing information associated with the first virtual network, and the addressing information of the second packet is assigned to routing information associated with the second virtual network. Thus as client come onto the network and begin transmitting data, the packet director in a router or other data communications device equipped with the invention is able to detect addressing and VLAN ID information in those packets and update appropriate VRF data for the corresponding VLAN (corresponding to the VLAN ID in the packet) to contain that address. If an address that was once assigned in one VLAN is now assigned to a new client in another VLAN, the packet director in the router can reassign that address to routing information (VRF data) exclusive to that new VLAN, and can remove the address from the old VRF data (for the VLAN in which it was earlier assigned).

In another example configuration, for return traffic (e.g. coming from a server in response to a client request), the packet director detects that the destination network address of the first packet is the same network address as the source network address from which the first packet arrived. The packet director propagates the first packet toward the first source network address on the first virtual network associated with (i.e. using) the first VRF containing the first source network address. In other words, the packet director receives the first packet on its way to return to the source destination, and determines the appropriate virtual network by examining the first VRF containing the source network address. Likewise, when the packet director detects that the destination network address of a second packet is the same network address as the source network address from which the second packet arrived, the packet director propagates the second packet toward the second source network address on the second virtual network associated with the second VRF containing the second source network address. In other words, the packet director receives the second packet on its way to return to the source destination, and determines the appropriate virtual network by examining the second VRF containing the source network address.

In one configuration, a situation may arise in which a portion of the network, such as a group of servers, are available to multiple VLANs. In such cases, a problem may arise in that when a router serving packets to that server from multiple VLANs receives the response from the server, the router would not know to which VLAN the response should be returned. To overcome this problem, the system of the invention provides that a packet director in a router or other data communications device that serves a portion of the network with traffic from multiple VLANs remembers or caches state associated with those packets (e.g. requests). The state can include an identity of the VLAN on which that request traffic arrived at the packet director and the source address of the packet. The packet director then forwards the request traffic onto the shared network portion (e.g. to the shared server). When the server responds, it will send a response packet containing, as a destination address, the address of the client device (the former source address of the request that prompts the response) that originated the packet and a port number to which it is responding. Using this information in the response form the server, the packet director can match or pair-up the previously cached state of the request packet to identify upon which VLAN the response packet is to be routed (i.e. using the appropriate VRF table for that VLAN as indicated by the state).

In operation of one example configuration using this technique, the packet director is operating on a shared device such as a shared router that processes traffic to servers for multiple VLANs. The packet director detects an incoming packet and captures a packet state of that incoming packet. The packet director associates the state of the incoming packet with the virtual network on which the incoming packet arrived. In an example configuration, the packet state contains the source network address of the incoming packet along with the port through which the incoming packet arrived. The packet director receives a response packet in response to the incoming packet, and examines the packet state of the response packet. The packet director matches the packet state of the incoming packet to the packet state of the response packet, and directs the response packet along the virtual network on which the incoming packet arrived.

During an example operation of one embodiment, suppose a device, such as a workstation, is attempting to connect to a virtual network to communicate with other devices on that same virtual network. The virtual network assigner assigns a network address to the workstation, and receives a request to authenticate the workstation, using HTTP authentication. During the HTTP authentication, the virtual network assigner determines an appropriate access level for the workstation, and assigns the workstation to a first virtual network that is associated with that access level. The network address assigned to the workstation is selected from a group of network addresses available to a group of virtual networks. Thus, after the HTTP authentication is completed, there is no need to reassign a network address to the workstation, since the original network address assigned to the workstation was chosen from a group of network addresses available to any virtual network within the group of virtual networks (including the first virtual network to which the workstation was assigned). That same network address is now no longer available to any other virtual network for the duration that the workstation continues to communicate on the first virtual network using that assigned network address.

When the workstation attempts to communicate with other devices within the first virtual network, by sending a packet along the first virtual network, the packet director detects a first incoming packet from the workstation. The packet director identifies the first incoming packet as being assigned to a first virtual network, and assigns the addressing information (i.e., the network address of the first incoming packet) to routing information (i.e., the VRF associated with the first virtual network). Each virtual network has its own associated VRF.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein include a virtual network assigner that allows a device to communicate using a virtual network using an appropriate virtual network for that device, and a packet director that directs a packet along the correct virtual network to which the packet has been assigned by the virtual network assigner.

The virtual network assigner assigns a network address to the device. The network address is selected from a group of network addresses that can be assigned to any virtual network within a group of virtual networks. The virtual network assigner receives a request to authenticate the device. In an example configuration, the virtual network assigner performs an HTTP authentication to determine the access level the device at which the device is authorized to communicate on the virtual network. The virtual network assigner determines the appropriate virtual network for the device, and then assigns the device to that virtual network. The network address is assigned first, then the appropriate virtual network for that device is chosen, and the assigned network address is associated with the chosen virtual network. The network address is chosen from a pool of network addressed that are available to a group of virtual networks. Thus, by assigning the network address first, HTTP authentication can be used to authenticate the device, yet that same network address can be used for the chosen virtual network because all the network addresses within the pool of network addresses are available to any virtual network within the group of virtual networks.

The packet director detects a first packet coming from a client. The packet director identifies the first packet as being assigned to a first virtual network, and assigns the addressing information of the first packet to routing information associated with the first virtual network. In an example configuration, the addressing information is a virtual network ID and the routing information is a VRF table associated with the first virtual network. The packet director routes the first packet (and subsequent packets, each having the addressing information of the first packet) using the routing information associated with the first virtual network. In an example configuration, the packet director detects a second packet coming from a client. The packet director identifies the second packet as being assigned to a second virtual network, and assigns the addressing information of the second packet to routing information associated with the second virtual network. In other words, the addressing information of the first packet is assigned to routing information associated with the first virtual network, and the addressing information of the second packet is assigned to routing information associated with the second virtual network. In other words, the VRF is dedicated to a VLAN. There is a VLAN to VRF mapping that is independent of the IP addresses.

Figure 1:
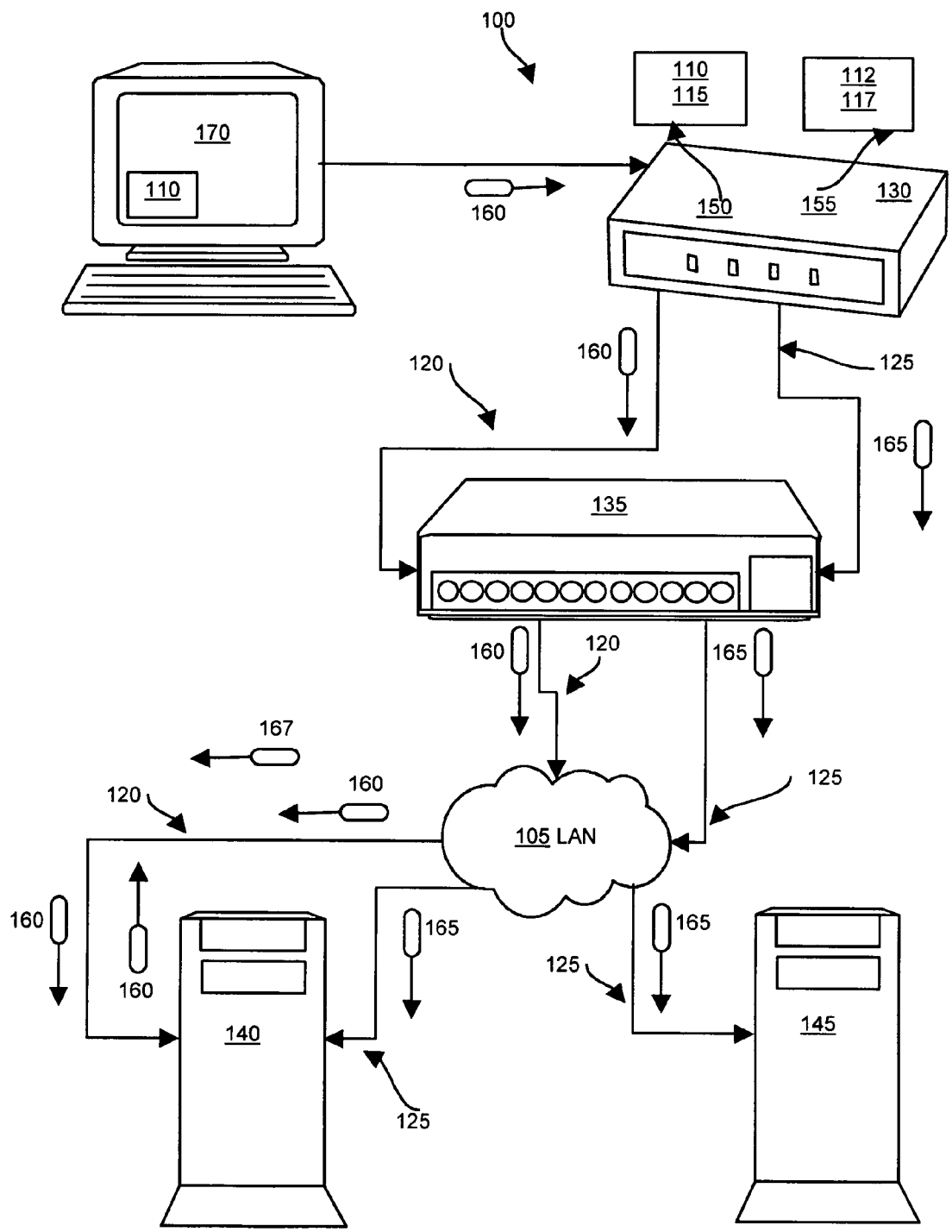
FIG. 1 shows a high level view of a network according to one embodiment disclosed herein.

FIG. 1 illustrates an example computer-networking environment 100 suitable for use in explaining example embodiments disclosed herein. The computer-networking environment 100 includes a device 170 attempting to communicate with a first virtual network 120. The device 170 obtains a first network address 110, and sends a first incoming packet 160 to a virtual network assigner 130. The virtual network assigner 130 contains a first VRF 150 containing the first network address 110, and first routing information 115. The virtual network assigner 130 also contains a second VRF 155 containing a second network address 112, and second routing information 117 relating to a second incoming packet 165 and second virtual network 125. The virtual network assigner 130 propagates the first incoming packet 120 along the first virtual network 120 toward the packet director 135. The packet director 135 receives the first incoming packet 160, identifies the first virtual network 120 to which the first incoming packet 160 is assigned, and propagates the first incoming packet 120 along a local area network (LAN) 105 toward a shared server 140. The shared server 140 is capable of receiving both the first incoming packet 160 sent via the first virtual network 120 and the second incoming packet 165 sent via the second virtual network 125. The packet director 135 receives a second incoming packet 165, identifies a second virtual network 125 to which the second incoming packet 165 is assigned, and propagates the second incoming packet 125 along a local area network (LAN) 105 toward a server 145. The packet director 135 also receives a third incoming packet 167 sent along the first virtual network 120.

Further details of configurations explained herein will now be provided with respect to a flow chart of processing steps that show the high level operations disclosed herein.

Figure 2:
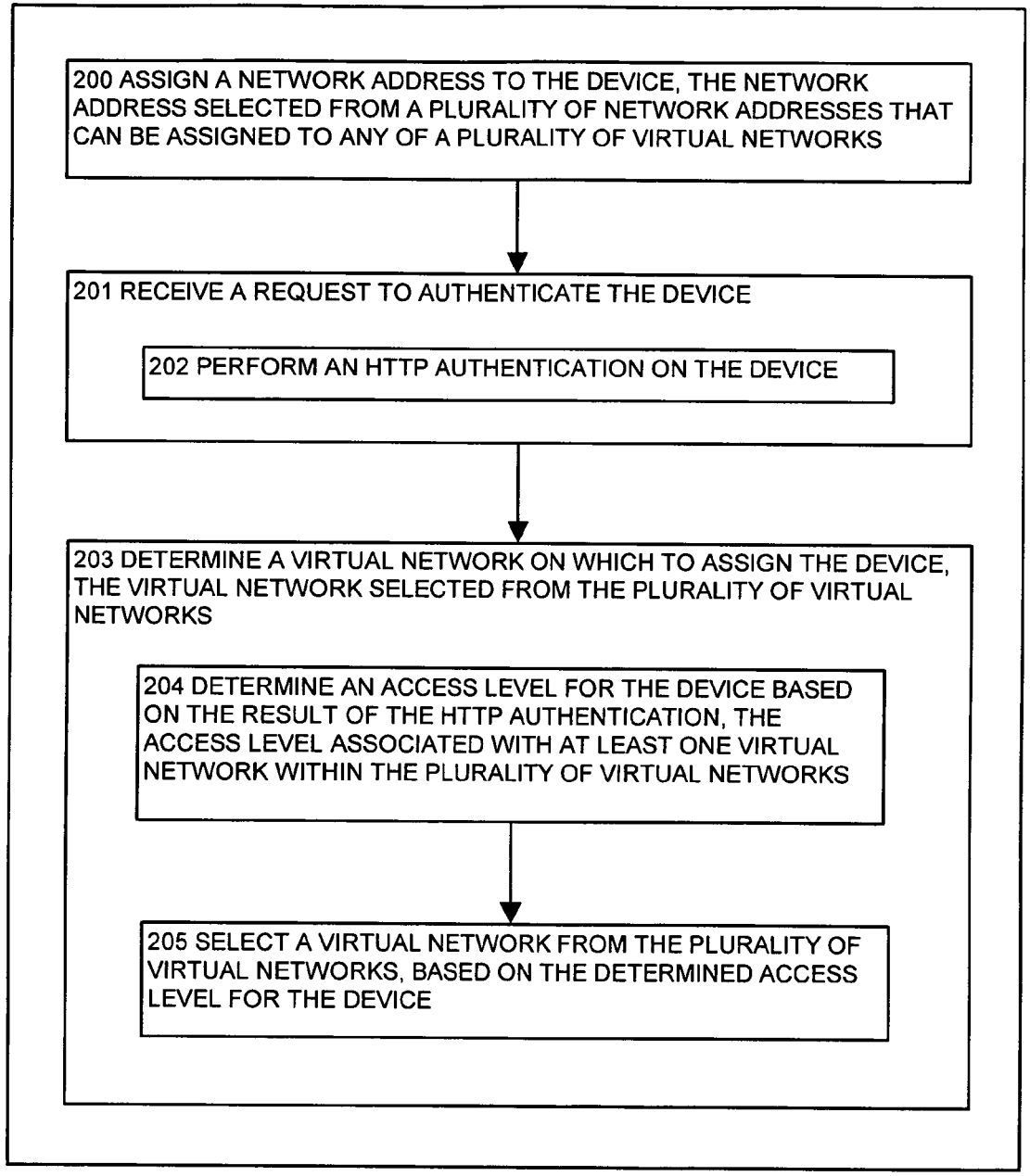
FIG. 2 illustrates a flowchart of a procedure performed by the system of FIG. 1 when the virtual network assigner assigns a network address to the device, the network address selected from a plurality of network addresses that can be assigned to any of a plurality of virtual networks, according to one embodiment disclosed herein.

FIG. 2 is a flowchart of the steps performed by the virtual network assigner 130 when it allows a device 170 to communicate using a virtual network by assigning a first network address 110, authenticating the device 170 using non supplicant authentication, and then assigning the device 170 to the appropriate first virtual network 120, based on the results of the non supplicant authentication.

In step 200, the virtual network assigner 130 assigns a first network address 110 to the device 170. The first network address 110 is selected from a plurality of network addresses that can be assigned to any of a plurality of virtual networks. That is, there exists a group of virtual networks, and a group of network addresses. In one example configuration, any of the network addresses from the group of network addresses can be assigned to any of the virtual networks for exclusive use of that virtual network.

In step 201, the virtual network assigner 130 receives a request to authenticate the device 170. In an example configuration, the device 170 is a workstation attempting to connect to a virtual network to communicate with other devices within the virtual network using non-802.1x supplicant authentication.

In step 202, the virtual network assigner 130 performs an HTTP authentication on the device 170. In an example configuration, a Dynamic Host Configuration Protocol (DHCP) exchange is performed and the network address, such as an Internet Protocol (IP) address, is received in return.

In step 203, the virtual network assigner 130 determines a virtual network on which to assign the device 170. The virtual network is selected from the plurality of virtual networks. Details regarding the selection of the appropriate virtual network for the device 170 will be further explained within sub steps 204 and 205.

In step 204, the virtual network assigner 130 determines an access level for the device 170 based on the result of the HTTP authentication. The access level is associated with at least one virtual network within the plurality of virtual networks.

In step 205, the virtual network assigner 130 selects a first virtual network 120 from the plurality of virtual networks to which to assign the device 170. The first virtual network 120 is chosen based on the determined access level for the device 170 (resulting from the HTTP authentication).

Figure 3:
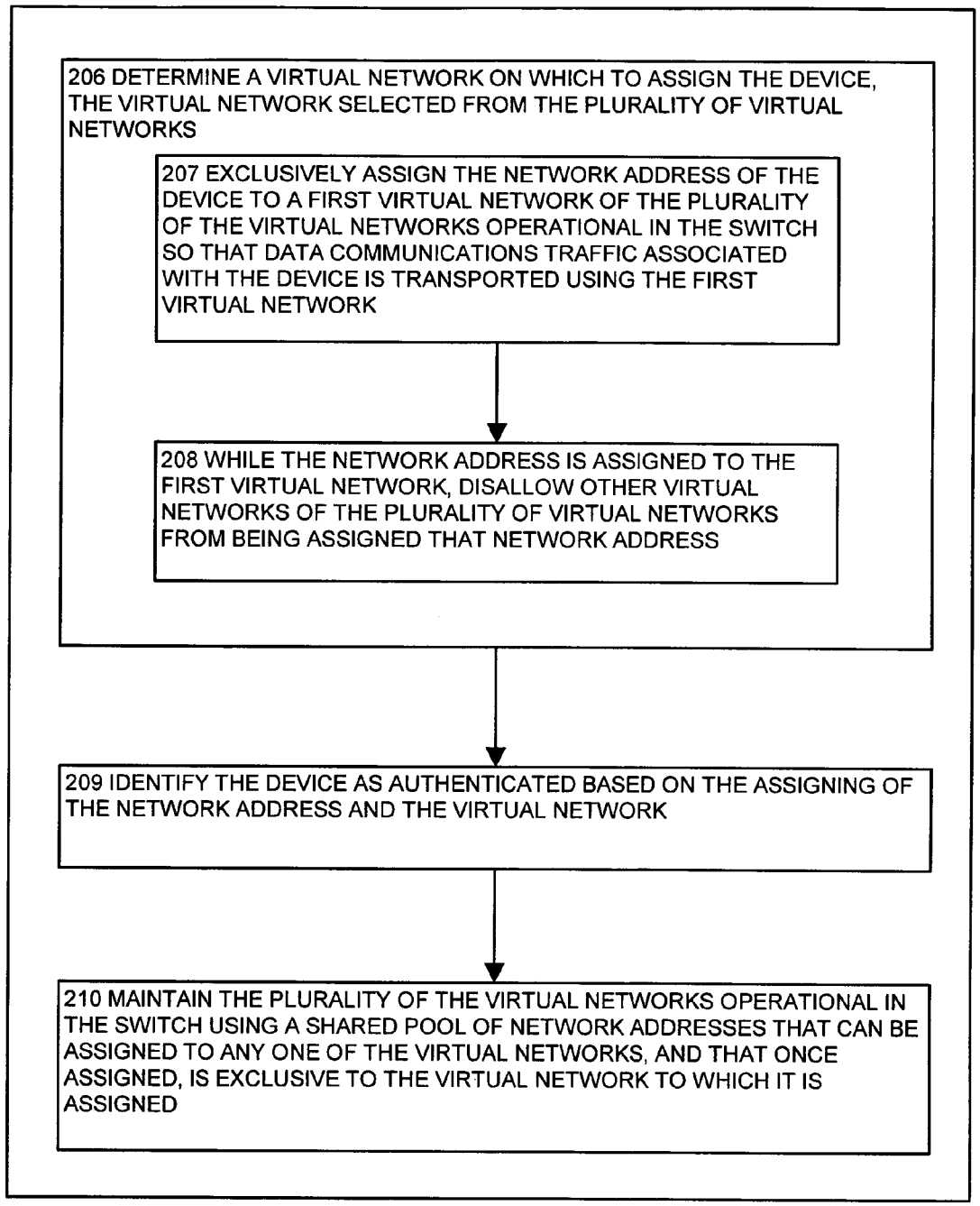
FIG. 3 illustrates a flowchart of a procedure performed by the system of FIG. 1 when the virtual network assigner determines a virtual network on which to assign the device, the virtual network selected from the plurality of virtual networks, according to one embodiment disclosed herein.

FIG. 3 is flowchart of the steps performed by the virtual network assigner 130 when it determines a first virtual network 120 on which to assign the device 170. The first virtual network 120 selected from the plurality of virtual networks, and chosen for the device 170 based on the results of the HTTP authentication.

In step 206, the virtual network assigner 130 determines a first virtual network 120 on which to assign the device 170. The first virtual network 120 is selected from the plurality of virtual networks.

In step 207, the virtual network assigner 130 exclusively assigns the first network address 110 of the device 170 to a first virtual network 120 of the plurality of the virtual networks operational in virtual network assigner 130. Thus, the data communications traffic (i.e., packets, etc) associated with the device 170 is transported using the first virtual network 120.

In step 208, while the first network address 110 is assigned to the first virtual network 120, the virtual network assigner 130 disallows other virtual networks of the plurality of virtual networks from being assigned that first network address 110. That is, once the first network address 110 has been assigned to the first network 120, that first network address 110 is no longer available (within the pool of network addresses that are available to the pool of virtual networks) to any other virtual network.

In step 209, the virtual network assigner 130 identifies the device 170 as authenticated based on the assigning of the first network address 110, and the first virtual network 120.

In step 210, the virtual network assigner 130 maintains the plurality of the virtual networks operational in the virtual network assigner 130, using a shared pool of network addresses that can be assigned to any one of the virtual networks. Once a network address is assigned, it is exclusive to the virtual network to which it is assigned.

Figure 4:
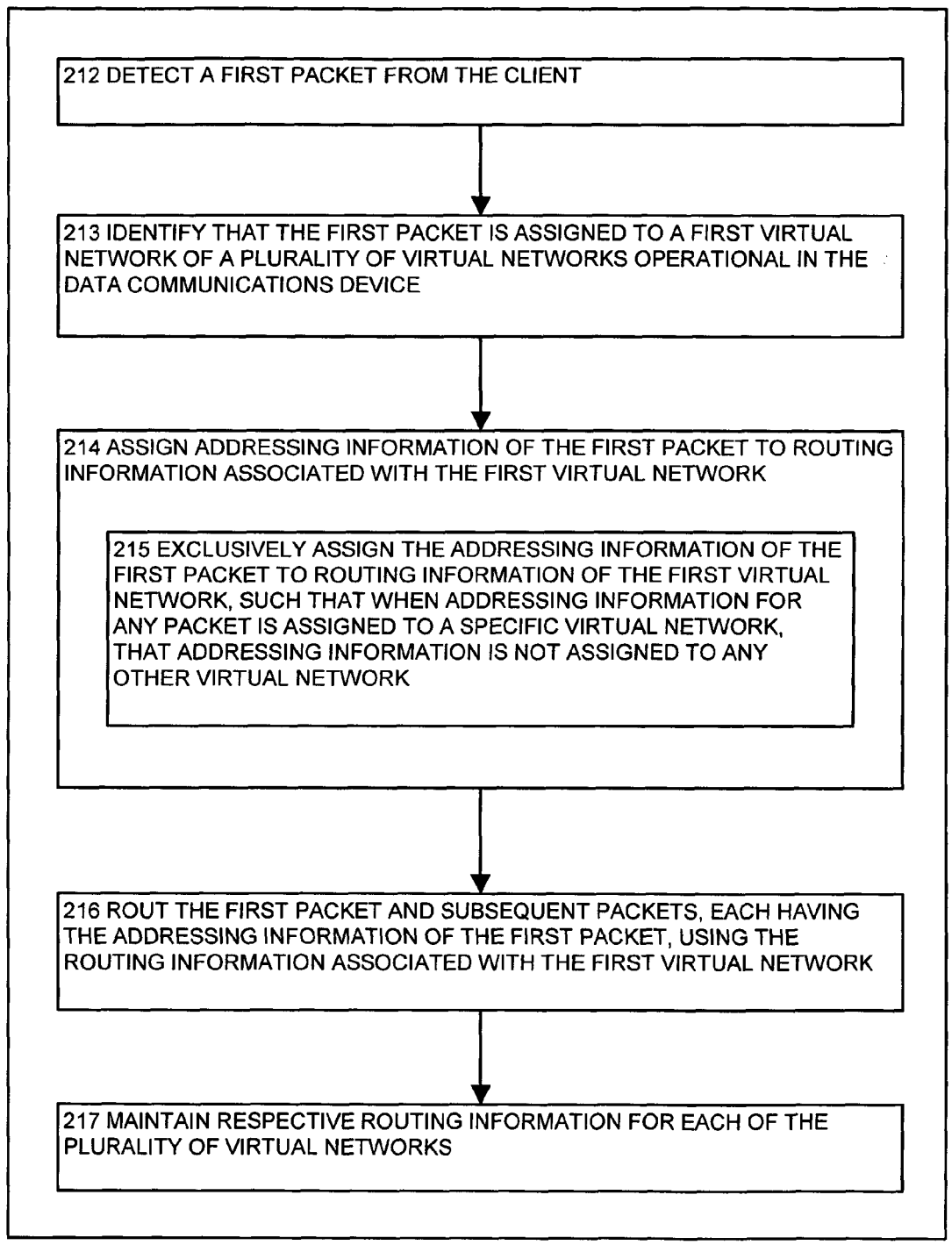
FIG. 4 illustrates a flowchart of a procedure performed by the system of FIG. 1 when the packet director detects a first packet from the client, according to one embodiment disclosed herein.

FIG. 4 is flowchart of the steps performed by the packet director 135 when it detects a first incoming packet 160 from a client, and routes the first incoming packet 160 along the appropriate virtual network.

In step 212, the packet director 135 detects a first incoming packet 160 from the client. In an example configuration, the device 170 sends a first incoming packet 160, via the virtual network assigner 130, along the first virtual network 120 assigned to the device 170.

In step 213, the packet director 135 identifies that the first incoming packet 160 is assigned to a first virtual network 120. The first virtual network 120 is one of a plurality of virtual networks operational in the packet director 135.

In step 214, the packet director 135 assigns addressing information (such as the first network address 110) of the first incoming packet 160 to routing information associated with the first virtual network 120. In an example configuration, the routing information contains a virtual network identifier, such as a VLAN ID. Further details concerning the routing information will be explained within sub steps 219 through 221.

In step 215, the packet director 135 exclusively assigns the addressing information of the first incoming packet 160 to routing information of the first virtual network 120, such that when addressing information for any packet is assigned to a specific virtual network, that addressing information is not assigned to any other virtual network.

In step 216, the packet director 135 routes the first incoming packet 160 using the routing information associated with the first virtual network 120. Any subsequent packet, having the addressing information (i.e., the first network address 110) of the first incoming packet 160, will also be routed along the first virtual network 120, using the routing information associated with the first virtual network 120.

In step 217, the packet director 135 maintains respective routing information for each of the plurality of virtual networks. That is, each virtual network, within the plurality of virtual networks has associated routing information exclusively for that virtual network.

Figure 5:
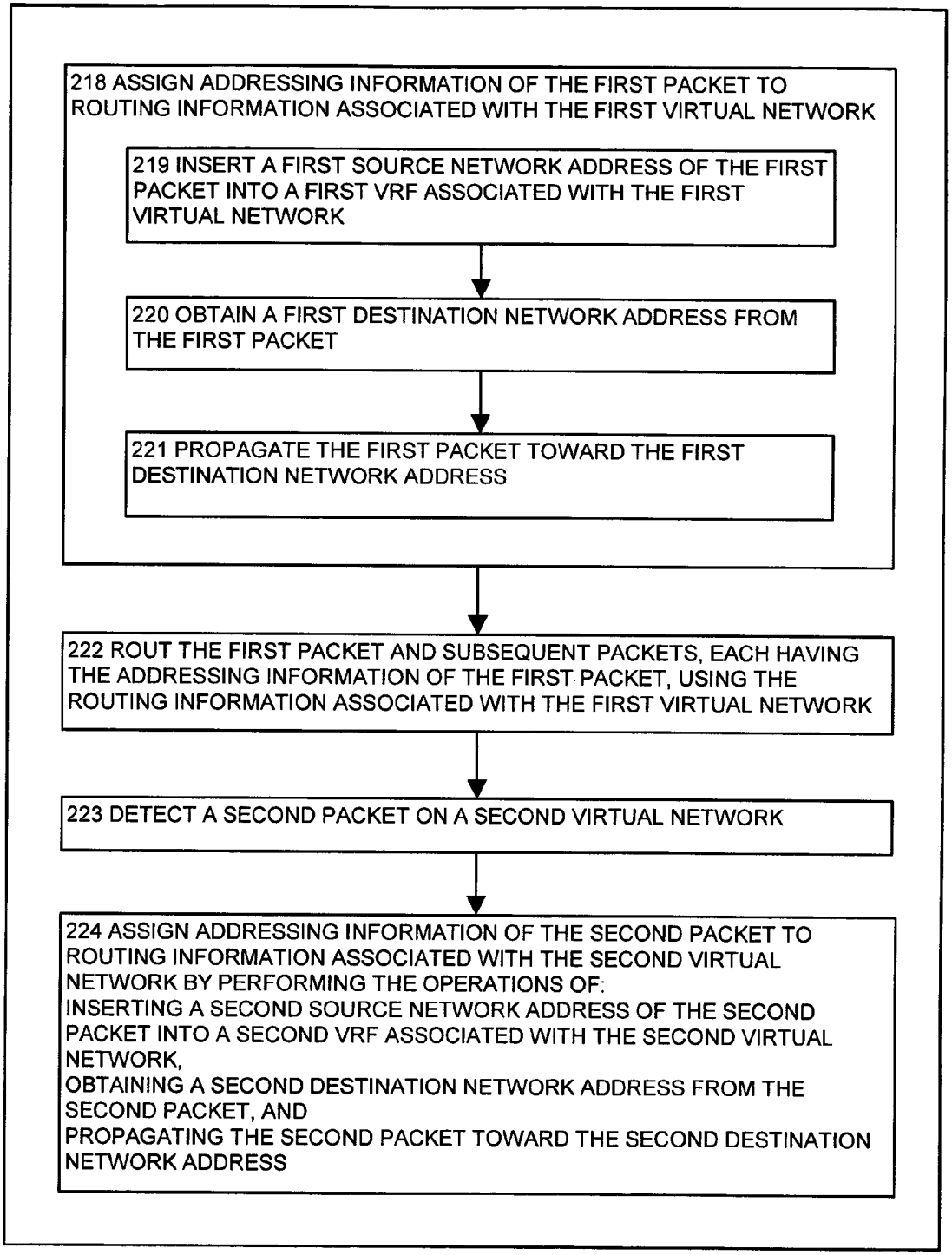
FIG. 5 illustrates a flowchart of a procedure performed by the system of FIG. 1 when the packet director assigns addressing information of the first packet to routing information associated with the first virtual network, according to one embodiment disclosed herein.

FIG. 5 is flowchart of the steps performed by the packet director 135 when it assigns addressing information of the first incoming packet 160 to routing information associated with the first virtual network 120. The packet director 135 maintains routing information for each of the virtual networks.

In step 218, the packet director 135 assigns addressing information of the first incoming packet 160 to routing information associated with the first virtual network 120. In an example configuration, the packet director 135 maintains separate VRF tables for each of the virtual networks. The VRF table (for each virtual network) contains, among other information, the network address associated with the virtual network and a virtual network identifier (i.e., a VLAN ID) identifying the virtual network.

In step 219, the packet director 135 inserts a first network address 110 (i.e., the source network address) of the first incoming packet 160 into a first VRF 150 associated with the first virtual network 120. The VLAN to VRF is a static mapping. The whole pool of IP addresses is shared across multiple VLANs, thus, the IP address is independent of the VLAN or VRF assignment. But, once the IP address is part of a VLAN/VRF it must remain within that group for the session duration.

In step 220, the packet director 135 obtains a first destination network address from the first incoming packet 160. The destination network address is the network address of the destination device to which the first incoming packet 160 is traveling.

In step 221, the packet director 135 propagates the first incoming packet 160 toward the first destination network address along the first virtual network 120. The packet director 135 determines the first virtual network 120 is the appropriate virtual network on which to propagate the first incoming packet based on information contained within a first VRF 150 associated with the first virtual network 120.

In step 222, the packet director 135 routs the first incoming packet 160 and subsequent packets, each having the addressing information of the first incoming packet 160, using the routing information associated with the first virtual network 120.

In step 223, the packet director 135 detects a second incoming packet 165 on a second virtual network 125. The second incoming packet 165 has a second network address 112.

In step 224, the packet director 135 assigns addressing information of the second incoming packet 165 to routing information associated with the second virtual network 125 by performing the operations of:
1) inserting a second network address 112 of the second incoming packet 165 into a second VRF 155 associated with the second virtual network 125,
2) obtaining a second destination network address from the second incoming packet 165, and
3) propagating the second incoming packet 165 toward the second destination network address.

Figure 6:
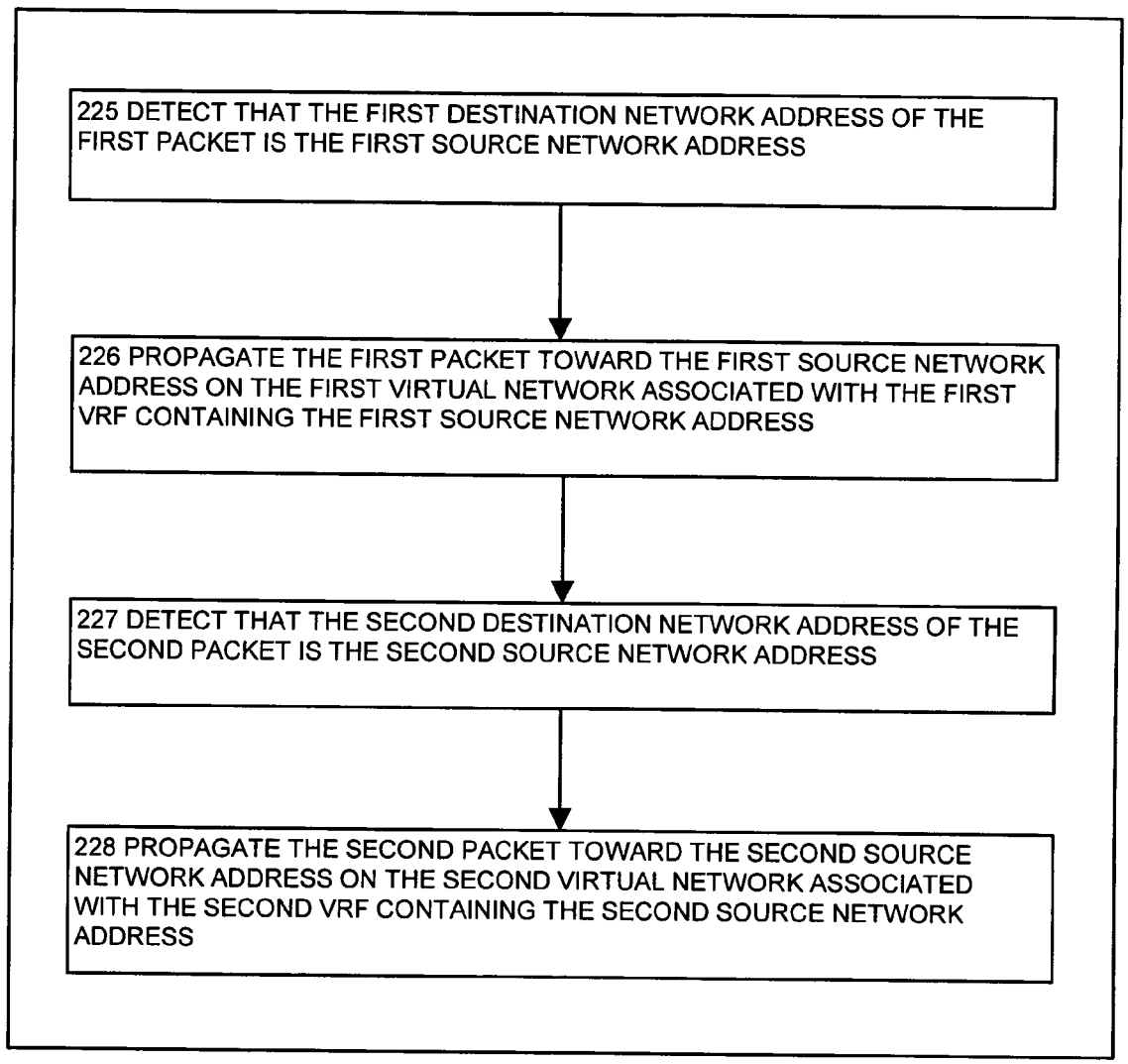
FIG. 6 illustrates a flowchart of a procedure performed by the system of FIG. 1 when the packet director detects that the first destination network address of the first packet is the first source network address, according to one embodiment disclosed herein.

FIG. 6 is flowchart of the steps performed by the packet director 135 when it detects that the first destination network address of the first incoming packet 160 is the same as the first network address 110.

In step 225, the packet director 135 detects that the first destination network address of the first incoming packet 160 is the first network address 110. That is, the first destination network address of the first incoming packet 160 is the same as the first network address 110, meaning the first incoming packet 160 is on a return route back to the device 170 from which the first incoming packet 160 was sent.

In step 226, the packet director 135 propagates the first incoming packet 160 toward the first network address 110 on the first virtual network 120 associated with the first VRF 150 containing the first network address 110. The packet director 135 determines the appropriate first virtual network 120 on which to send the first incoming packet 160 (back to the device 170 from which the first incoming packet 160 was sent) based on matching the first network address 110 and the first routing information 115 contained within the first VRF 150.

In step 227, the packet director 135 detects that the second destination network address 112 of the second incoming packet 165 is the second network address 112. That is, the second destination network address of the second incoming packet 165 is the same as the second network address 112, meaning the second incoming packet 165 is on a return route back to the device (not shown) from which the second incoming packet 165 was sent.

In step 228, the packet director 135 propagates the second incoming packet 165 toward the second network address 112 on the second virtual network 125 associated with the second VRF 155 containing the second network address 112. The packet director 135 determines the appropriate second virtual network 125 on which to send the second incoming packet 165 (back to the device, not show, from which the second incoming packet 165 was sent) based on matching the second network address 112 and the second routing information 117 contained within the second VRF 155.

Figure 7:
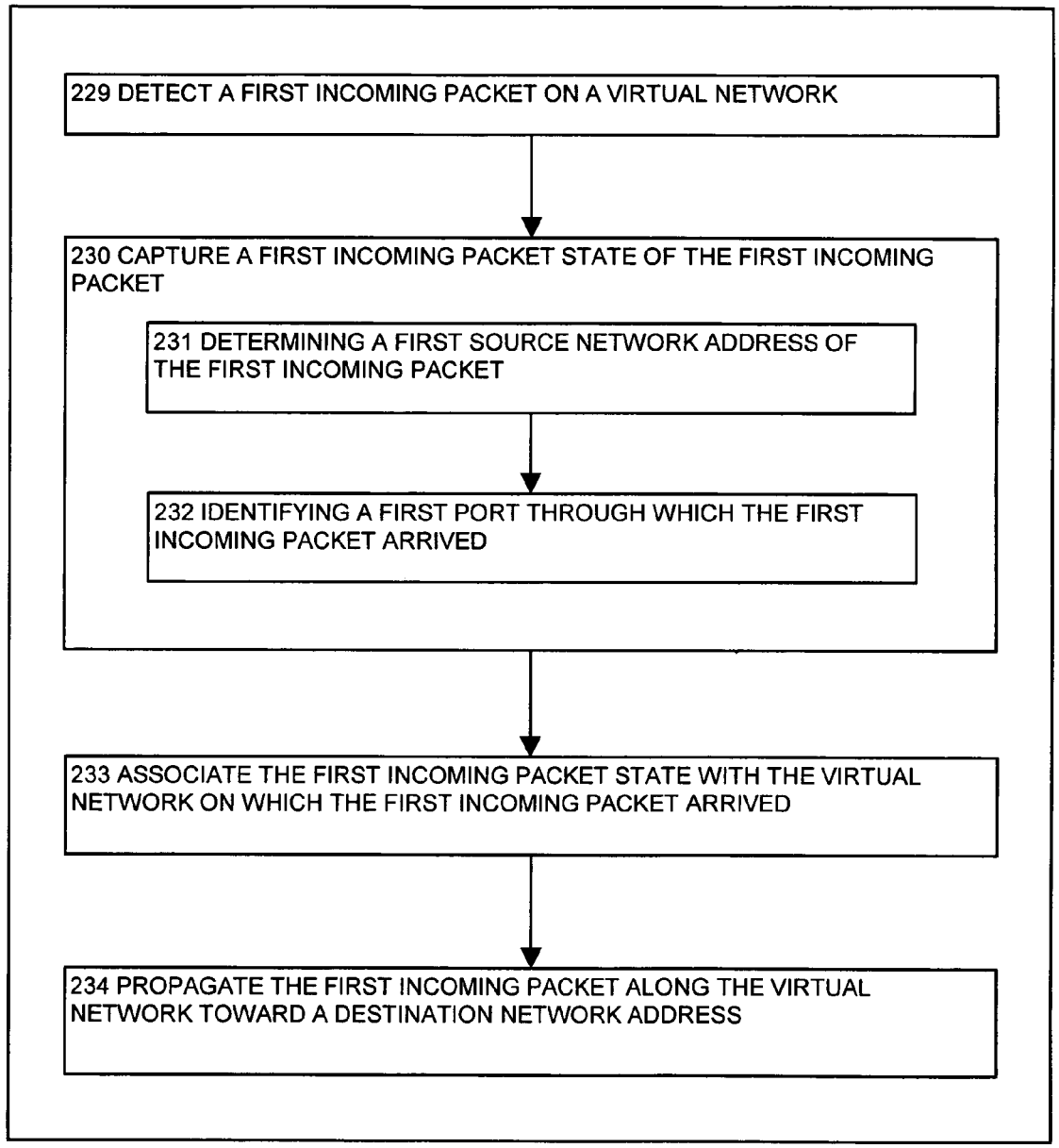
FIG. 7 illustrates a flowchart of a procedure performed by the system of FIG. 1 when the packet director detects a first incoming packet on a virtual network, according to one embodiment disclosed herein.

FIG. 7 is flowchart of the steps performed by the packet director 135 when it detects a first incoming packet 160 on a first virtual network 120 toward a shared server 140. A shared server 140 receives and transmits packets over more than one virtual network.

In step 229, the packet director 135 detects a first incoming packet 160 on a first virtual network 120. The first incoming packet 160 is destined for a shared server 140, capable of receiving and transmitting packets via more than one virtual network regardless of which network address is assigned to a virtual network. In step 230, the packet director 135 captures a first incoming packet state of the first incoming packet 160. In an example configuration, the packet director 135 includes a firewall that captures the first incoming packet state of the first incoming packet 160.

In step 231, the packet director 135 determines a first network address 110 of the first incoming packet 160.

In step 232, the packet director 135 identifies a first port through which the first incoming packet 160 arrived on the packet director 135.

In step 233, the packet director 135 associates the first incoming packet state with the first virtual network 120 on which the first incoming packet 160 arrived. The first incoming packet state is comprised of the first network address 110 of the first incoming packet 160, and the first port through which the first incoming packet 160 arrived on the packet director 135. The packet director 135 associates the first incoming packet state with the first incoming packet 160.

In step 234, the packet director 135 propagates the first incoming packet 160 along the first virtual network 120 toward a first destination network address. In an example configuration, the first destination network address belongs to a shared server 140, capable of receiving and transmitting packets via more than one virtual network. In other words, on the egress of the network the source VPN (VRF) has to be tracked to assure that the return traffic uses the same VPN as the incoming traffic.

Figure 8:
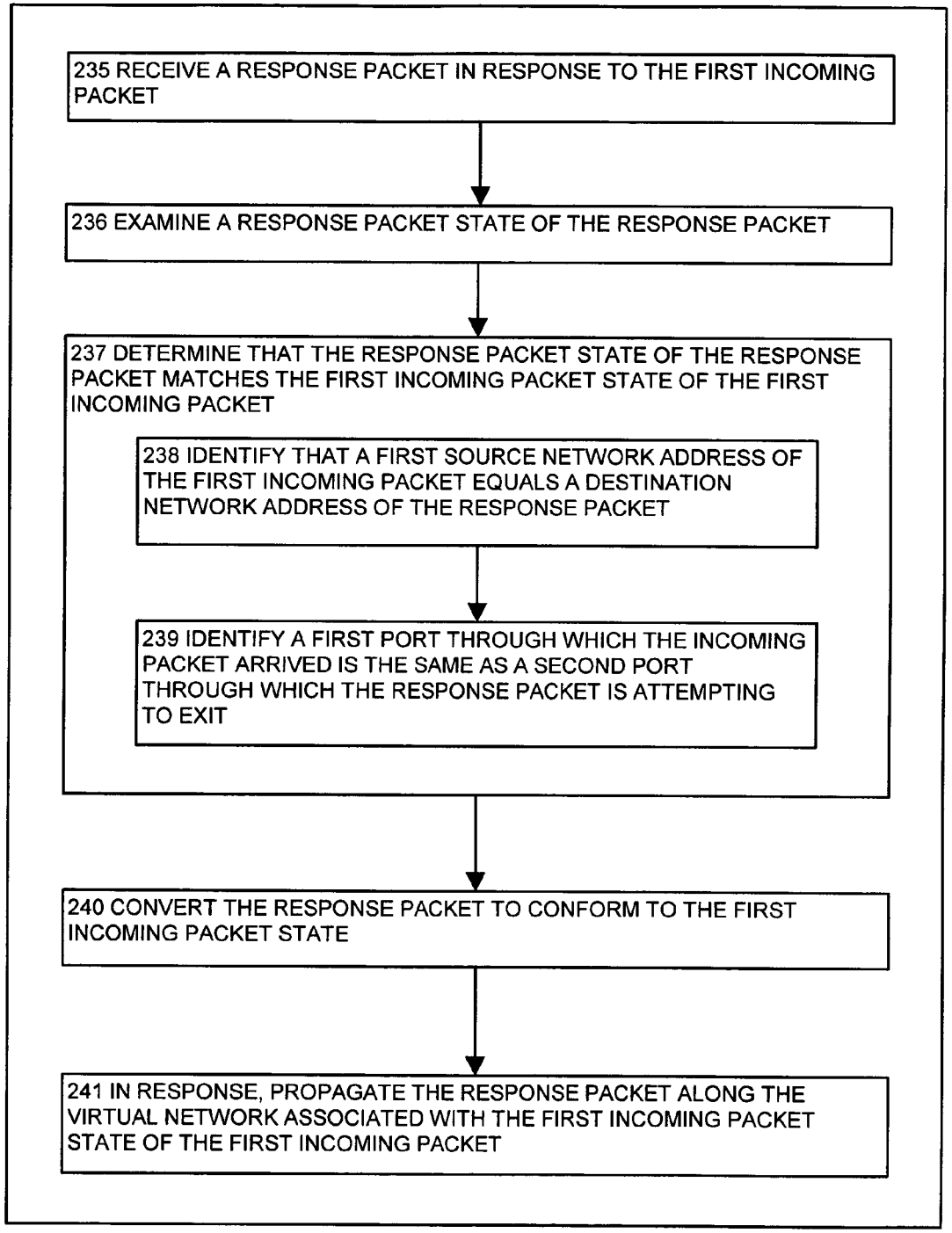
FIG. 8 illustrates a flowchart of a procedure performed by the system of FIG. 1 when the packet director receives a response packet in response to the first incoming packet, according to one embodiment disclosed herein.

FIG. 8 is flowchart of the steps performed by the packet director 135 when it receives a response packet in response to the first incoming packet 160 on a shared server 140.

In step 235, the packet director 135 receives a response packet in response to the first incoming packet 160. The first incoming packet 160 was transmitted to the shared server 140, and the response packet has now been sent in response.

In step 236, the packet director 135 examines a response packet state of the response packet. The packet state is a means by which to determine the appropriate virtual network for packets received by the packet director 135 when those packets originate from a shared server 140.

In step 237, the packet director 135 determines that the response packet state of the response packet matches the first incoming packet state of the first incoming packet 160. The details of this action are further explained within the sub steps of 238 and 239.

In step 238, the packet director 135 identifies that a first network address 110 of the first incoming packet 160 equals a destination network address of the response packet. In other words, the response packet was sent in response to the first incoming packet 160, and the response packet is on its way back to the device 170 from which the first incoming packet 160 was sent.

In step 239, the packet director 135 identifies a first port through which the first incoming packet 160 arrived is the same as a second port through which the response packet is attempting to exit. Thus, the response packet state of the response packet matches the first incoming packet state of the first packet 160 based on the matching network addresses and ports.

In step 240, the packet director 135 converts the response packet to conform to the first incoming packet state. The packet director 135 assigns the response packet to travel along the first virtual network 120 associated with the first incoming packet state for the first incoming packet 160.

In step 241, in response, the packet director 135 propagates the response packet along the first virtual network 120 associated with the first incoming packet state of the first incoming packet 160.

Figure 9:
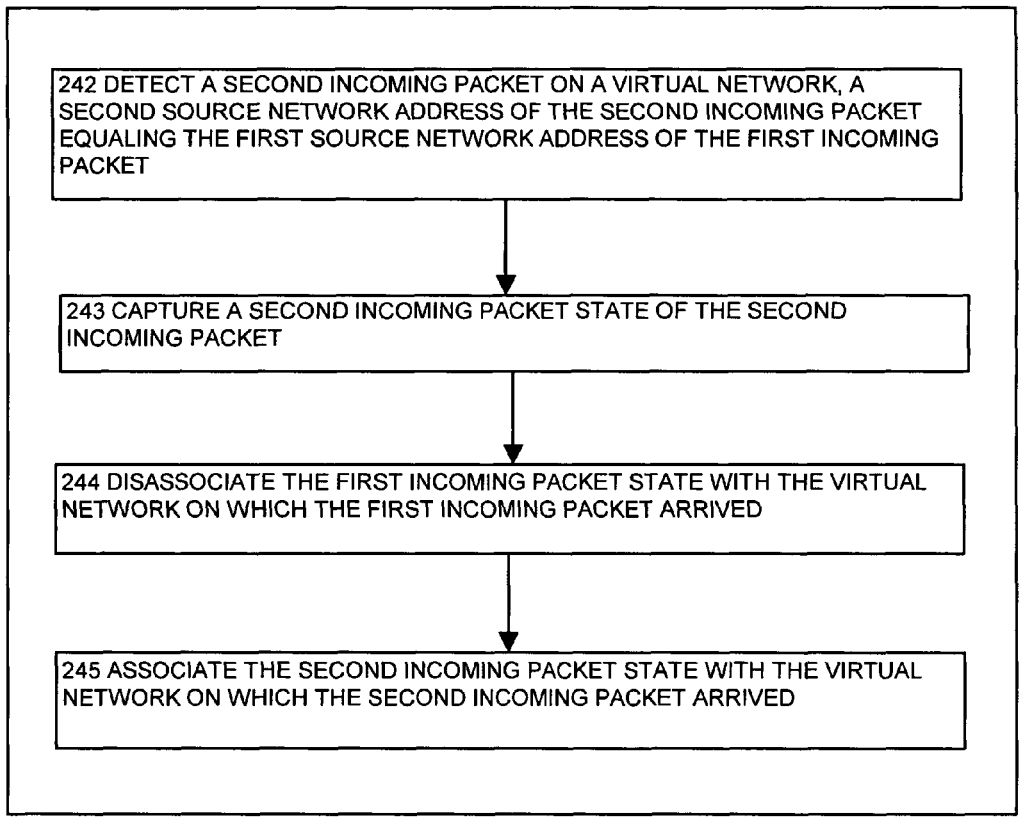
FIG. 9 illustrates a flowchart of a procedure performed by the system of FIG. 1 when the packet director detects a second incoming packet on a virtual network, a second source network address of the second incoming packet equaling the first source network address of the first incoming packet, according to one embodiment disclosed herein.

FIG. 9 is flowchart of the steps performed by the packet director 135 when it detects a third incoming packet 167 on a first virtual network 120. The network address of the third incoming packet 167 equals the first network address 110 of the first incoming packet 160.

In step 242, the packet director 135 detects a third incoming packet 167 on a first virtual network 120. The network address of the third incoming packet 167 equals the first network address 110 of the first incoming packet 160. That is, the packet director 135 has detected a new packet containing the same network address (i.e., first network address 110) as the first incoming packet 160.

In step 243, the packet director 135 captures a third incoming packet state of the third incoming packet 167. The third incoming packet state contains the network address of the third incoming packet 167 (that is the same as the first network address 110 of the first incoming packet 160), and the port through which the third incoming packet 167 arrived on the packet director 135.

In step 244, the packet director 135 disassociates the first incoming packet state with the first virtual network 120 on which the first incoming packet 160 arrived. By receiving a third incoming packet 167 containing the same first network address 110 as the first incoming packet 160, the packet director 135 detects that the first incoming packet 160 is no longer associated with the first network address 110, nor the first network address 110.

In step 245, the packet director 135 associates the third incoming packet state with the first virtual network on which the third incoming packet 167 arrived. Thus, when the third incoming packet 167 is on a return trip, the packet director 135 will examine the contents of that response packet to determine the response packet state, and will determine that the response packet should be propagated along the first virtual network 120 from which the third incoming packet 167 originated.

In an example configuration, a system has a first data communications device and a second communications device. The devices is configured to perform the operations of 1) assigning a network address to the device, the network address selected from a plurality of network addresses that can be assigned to any of a plurality of virtual networks, 2) receiving a request to authenticate the device, 3) determining a virtual network on which to assign the device, the virtual network selected from the plurality of virtual networks, and 4) identifying the device as authenticated based on the assigning of the network address and the virtual network. The second communications device is configured to perform the operations of 1) detecting a first packet from the client, 2) identifying that the first packet is assigned to a first virtual network of a plurality of virtual networks operational in the data communications device, 3) assigning addressing information of the first packet to routing information associated with the first virtual network, and 4) routing the first packet and subsequent packets, each having the addressing information of the first packet, using the routing information associated with the first virtual network. In another example configuration, the system also has a third data communications device configured to perform the operations of 1) detecting a first incoming packet on a virtual network, 2) capturing a first incoming packet state of the first incoming packet, 3) associating the first incoming packet state with the virtual network on which the first incoming packet arrived, and 4) propagating the first incoming packet along the virtual network toward a destination network address.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A method for allowing a device to communicate using a virtual network, the method comprising:
assigning a network address to the device, the network address selected from a plurality of network addresses that can be assigned to any of a plurality of virtual networks;
authorizing the device to be included in each of the plurality of virtual networks, wherein the device is configured to maintain the assigned network address when the device is included in any one of the plurality of virtual networks;
receiving a request to authenticate the device;
determining a virtual network on which to assign the device, the virtual network selected from the plurality of virtual networks; and
authenticating the device to be included in the assigned virtual network based on the request to authenticate.

2. The method of claim 1 wherein receiving a request to authenticate the device comprises:
performing an HTTP authentication on the device; and
wherein determining a virtual network on which to assign the device comprises:
determining an access level for the device based on the result of the HTTP authentication, the access level associated with at least one virtual network within the plurality of virtual networks; and
selecting a virtual network from the plurality of virtual networks, based on the determined access level for the device.

3. The method of claim 1 wherein determining a virtual network on which to assign the device, the virtual network selected from the plurality of virtual networks comprises:
exclusively assigning the network address of the device to a first virtual network of the plurality of the virtual networks operational in the switch so that data communications traffic associated with the device is transported using the first virtual network; and
while the network address is assigned to the first virtual network, disallowing other virtual networks of the plurality of virtual networks from being assigned that network address.

4. The method of claim 3 wherein receiving a request to authenticate the device comprises:
performing a non-802.1x supplicant authentication.

5. The method of claim 3 comprising:
maintaining the plurality of the virtual networks operational in the switch using a shared pool of network addresses that can be assigned to anyone of the virtual networks, and that once assigned, is exclusive to the virtual network to which it is assigned.

6. In a data communications device, a method of allowing a client to communicate using a virtual network, the method comprising:
detecting a first packet from the client, wherein the client includes an assigned network address associated with a plurality of virtual networks, and wherein the client is configured to maintain the assigned network address when the device is included in any one of the plurality of virtual networks;
identifying that the first packet is assigned to a first virtual network of the plurality of virtual networks operational in the data communications device;
assigning addressing information associated with the assigned network address of the first packet to routing information associated with the first virtual network; and
routing the first packet and subsequent packets, each having the addressing information of the first packet, using the routing information associated with the first virtual network.

7. The method of claim 6 comprising:
maintaining respective routing information for each of the plurality of virtual networks, and
wherein assigning addressing information associated with the assigned network address of the first packet to routing information associated with the first virtual network comprises:
exclusively assigning the addressing information of the first packet to routing information of the first virtual network, such that when addressing information for any packet is assigned to a specific virtual network, that addressing information is not assigned to any other virtual network.

8. The method of claim 6 wherein assigning addressing information associated with the assigned network address of the first packet to routing information associated with the first virtual network comprises:
inserting a first source network address that includes the assigned network address of the first packet into a first VRF associated with the first virtual network;
obtaining a first destination network address from the first packet;
propagating the first packet toward the first destination network address; and wherein the method comprises:
detecting a second packet on a second virtual network;
assigning addressing information of the second packet to routing information associated with the second virtual network by performing the operations of:
inserting a second source network address of the second packet into a second VRF associated with the second virtual network; and
obtaining a second destination network address from the second packet;
and propagating the second packet toward the second destination network address.

9. The method of claim 8 comprising:
detecting that the first destination network address of the first packet is the first source network address;
propagating the first packet toward the first source network address on the first virtual network associated with the first VRF containing the first source network address;
detecting that the second destination network address of the second packet is the second source network address; and
propagating the second packet toward the second source network address on the second virtual network associated with the second VRF containing the second source network address.

10. In a data communications device, a method of allowing a client to communicate with a shared device using a virtual network the method comprising:
detecting a first incoming packet on a virtual network;
capturing a first incoming packet state of the first incoming packet;
associating the first incoming packet state with the virtual network on which the first incoming packet arrived;

propagating the first incoming packet along the virtual network toward a destination network address;

receiving a response packet in response to the first incoming packet;

examining a response packet state of the response packet;

determining that the response packet state of the response packet matches the first incoming packet state of the first incoming packet;

converting the response packet to conform to the first incoming packet state; and in response, propagating the response packet along the virtual network associated with the first incoming packet state of the first incoming packet.

11. The method of claim 10 wherein capturing a first incoming packet state of the first incoming packet comprises:

determining a first source network address of the first incoming packet; and identifying a first port through which the first incoming packet arrived.

12. The method of claim 10 wherein determining that the response packet state of the response packet matches the first incoming packet state of the first incoming packet comprises:

identifying that a first source network address of the first incoming packet equals a destination network address of the response packet; and identifying a first port through which the incoming packet arrived is the same as a second port through which the response packet is attempting to exit.

13. The method of claim 10 comprising:

detecting a second incoming packet on a virtual network, a second source network address of the second incoming packet equaling the first source network address of the first incoming packet;

capturing a second incoming packet state of the second incoming packet;

disassociating the first incoming packet state with the virtual network on which the first incoming packet arrived; and associating the second incoming packet state with the virtual network on which the second incoming packet arrived.

14. A system for allowing a device to communicate using a virtual network, the system comprising:

in a first data communications device configured to perform the operations of:

assigning a network address to the device, the network address selected from a plurality of network addresses that can be assigned to any of a plurality of virtual networks;

authorizing the device to be included in each of the plurality of virtual networks, wherein the device is configured to maintain the assigned network address when the device is included in any one of the plurality of virtual networks;

receiving a request to authenticate the device;

determining a first virtual network on which to assign the device, the virtual network selected from the plurality of virtual networks; and authenticating the device to be included in the assigned virtual network based on the request to authenticate; and in a second data communications devices, performing the operations of: detecting a first packet from the device;

identifying that the first packet is assigned to a first virtual network of the plurality of virtual networks operational in the data communications device;

assigning addressing information associated with the assigned network address of the first packet to routing information associated with the first virtual network; and routing the first packet and subsequent packets, each having the addressing information of the first packet, using the routing information associated with the first virtual network.

15. The system of claim 14 comprising:

in a third data communications devices, performing the operations of:

detecting a first incoming packet on the first virtual network;

capturing a first incoming packet state of the first incoming packet;

associating the first incoming packet state with the first virtual network on which the first incoming packet arrived; and propagating the first incoming packet along the virtual network toward a destination network address.

16. A computerized device comprising:

a memory;

a processor;

a communications interface;

an interconnection mechanism coupling the memory, the processor and the communications interface;

wherein the memory is encoded with an virtual network assigning application that when executed on the processor allows a device to communicate using a virtual network by performing the operations of:

assigning a network address to the device, the network address selected from a plurality of network addresses that can be assigned to any of a plurality of virtual networks;

authorizing the device to be included in each of the plurality of virtual networks, wherein the device is configured to maintain the assigned network address when the device is included in any one of the plurality of virtual networks;

receiving a request to authenticate the device;

determining a virtual network on which to assign the device, the virtual network selected from the plurality of virtual networks; and authenticating the device to be included in the assigned virtual network based on the request to authenticate.

17. The computerized device of claim 16 wherein when the computerized device performs the operation of receiving a request to authenticate the device, the computerized device performs the operation of:

performing an HTTP authentication on the device; and wherein when the computerized device performs the operation of determining a virtual network on which to assign the device, the computerized device performs the operations of:

determining an access level for the device based on the result of the HTTP authentication, the access level associated with at least one virtual network within the plurality of virtual networks; and selecting a virtual network from the plurality of virtual networks, based on the determined access level for the device.

18. The computerized device of claim 16 wherein when the computerized device performs the operation of determining a virtual network on which to assign the device, the virtual network selected from the plurality of virtual networks, the computerized device performs the operations of:

exclusively assigning the network address of the device to a first virtual network of the plurality of the virtual networks operational in the switch so that data communications traffic associated with the device is transported using the first virtual network; and while the network address is assigned to the first virtual network, disallowing other virtual networks of the plurality of virtual networks from being assigned that network address.

19. The computerized device of claim 18 wherein when the computerized device performs the operation of receiving a request to authenticate the device, the computerized device performs the operation of:

performing a non-802.1x supplicant authentication.

20. The computerized device of claim 18 wherein the computerized device performs the operation of:

maintaining the plurality of the virtual networks operational in the switch using a shared pool of network addresses that can be assigned to anyone of the virtual networks, and that once assigned, is exclusive to the virtual network to which it is assigned.

21. A computerized device comprising:

a memory;

a processor;

a communications interface;

an interconnection mechanism coupling the memory, the processor and the communications interface;

wherein the memory is encoded with virtual packet directing application that when executed on the processor allows a client to communicate using a virtual network by performing the operations of:

detecting a first packet from the client, wherein the client includes an assigned network address associated with a plurality of virtual networks, and wherein the client is configured to maintain the assigned network address when the device is included in any one of the plurality of virtual networks;

identifying that the first packet is assigned to a first virtual network of the plurality of virtual networks operational in the data communications device;

assigning addressing information associated with the assigned network address of the first packet to routing information associated with the first virtual network; and routing the first packet and subsequent packets, each having the addressing information of the first packet, using the routing information associated with the first virtual network.

22. The computerized device of claim 21 wherein the computerized device performs the operation of:

maintaining respective routing information for each of the plurality of virtual networks, and wherein when the computerized device performs the operation of assigning addressing information associated with the assigned network address of the first packet to routing information associated with the first virtual network, the computerized device performs the operation of:

exclusively assigning the addressing information of the first packet to routing information of the first virtual network, such that when addressing information for any packet is assigned to a specific virtual network, that addressing information is not assigned to any other virtual network.

23. The computerized device of claim 21 wherein when the computerized device performs the operation of assigning addressing information associated with the assigned network address of the first packet to routing information associated with the first virtual network, the computerized device performs the operations of:

inserting a first source network address of the first packet into a first VRF associated with the first virtual network;

obtaining a first destination network address from the first packet;

propagating the first packet toward the first destination network address;

and wherein the computerized device performs the operations of:

detecting a second packet on a second virtual network;

assigning addressing information of the second packet to routing information associated with the second virtual network by performing the operations of:

inserting a second source network address of the second packet into a second VRF associated with the second virtual network;

obtaining a second destination network address from the second packet; and propagating the second packet toward the second destination network address.

24. The computerized device of claim 23 wherein the computerized device performs the operations of:

detecting that the first destination network address of the first packet is the first source network address;

propagating the first packet toward the first source network address on the first virtual network associated with the first VRF containing the first source network address;

detecting that the second destination network address of the second packet is the second source network address; and propagating the second packet toward the second source network address on the second virtual network associated with the second VRF containing the second source network address.

25. A computerized device comprising:

a memory;

a processor;

a communications interface;

an interconnection mechanism coupling the memory, the processor and the communications interface;

wherein the memory is encoded with an virtual packet directing application that when executed on the processor allows a client to communicate with a shared device using a virtual network by performing the operations of:

detecting a first incoming packet on a virtual network;

capturing a first incoming packet state of the first incoming packet;

associating the first incoming packet state with the virtual network on which the first incoming packet arrived;

propagating the first incoming packet along the virtual network toward a destination network address;

receiving a response packet in response to the first incoming packet;

examining a response packet state of the response packet;

determining that the response packet state of the response packet matches the first incoming packet state of the first incoming packet; and converting the response packet to conform to the first incoming packet state; and in response, propagating the response packet along the virtual network associated with the first incoming packet state of the first incoming packet.

26. The computerized device of claim 25 wherein when the computerized device performs the operation of capturing a first incoming packet state of the first incoming packet comprises:
- determining a first source network address of the first incoming packet; and
- identifying a first port through which the first incoming packet arrived.

27. The computerized device of claim 25 wherein when the computerized device performs the operation of determining that the response packet state of the response packet matches the first incoming packet state of the first incoming packet, the computerized device performs the operations of:
- identifying that a first source network address of the first incoming packet equals a destination network address of the response packet; and
- identifying a first port through which the incoming packet arrived is the same as a second port through which the response packet is attempting to exit.

28. The computerized device of claim 27 wherein the computerized device performs the operations of:
- detecting a second incoming packet on a virtual network, a second source network address of the second incoming packet equaling the first source network address of the first incoming packet;
- capturing a second incoming packet state of the second incoming packet;
- disassociating the first incoming packet state with the virtual network on which the first incoming packet arrived; and
- associating the second incoming packet state with the virtual network on which the second incoming packet arrived.

29. A computer readable medium encoded with computer programming logic that when executed on a process in a computerized device produces a virtual network assigning process that allows a device to communicate using a virtual network by causing the computerized device to perform the operations of:
- assigning a network address to the device, the network address selected from a plurality of network addresses that can be assigned to any of a plurality of virtual networks;
- authorizing the device to be included in each of the plurality of virtual networks, wherein the device is configured to maintain the assigned network address when the device is included in any one of the plurality of virtual networks;
- receiving a request to authenticate the device;
- determining a virtual network on which to assign the device, the virtual network selected from the plurality of virtual networks; and
- authenticating the device to be included in the assigned virtual network based on the request to authenticate.

30. A computer readable medium encoded with computer programming logic that when executed on a process in a computerized device produces a packet directing process that allows a client to communicate using a virtual network by causing the computerized device to perform the operations of:
- detecting a first packet from the client, wherein the client includes an assigned network address associated with a plurality of virtual networks, and wherein the client is configured to maintain the assigned network address when the device is included in any one of the plurality of virtual networks;
- identifying that the first packet is assigned to a first virtual network of the plurality of virtual networks operational in the data communications device;
- assigning addressing information associated with the assigned network address of the first packet to routing information associated with the first virtual network; and
- routing the first packet and subsequent packets, each having the addressing information of the first packet, using the routing information associated with the first virtual network.

31. A computer readable medium encoded with computer programming logic that when executed on a process in a computerized device produces a packet directing process that allows a client to communicate with a shared device using a virtual network by causing the computerized device to perform the operations of:
- detecting a first incoming packet on a virtual network;
- capturing a first incoming packet state of the first incoming packet;
- associating the first incoming packet state with the virtual network on which the first incoming packet arrived;
- propagating the first incoming packet along the virtual network toward a destination network address;
- receiving a response packet in response to the first incoming packet;
- examining a response packet state of the response packet;
- determining that the response packet state of the response packet matches the first incoming packet state of the first incoming packet;
- converting the response packet to conform to the first incoming packet state; and
- in response, propagating the response packet along the virtual network associated with the first incoming packet state of the first incoming packet.

32. A computerized device comprising:
- a memory;
- a processor;
- a communications interface;
- an interconnection mechanism coupling the memory, the processor and the communications interface;
- where the memory is encoded with an virtual network assigning application that when executed on the processor configures the computerized device with a means for allowing a device to communicate using a virtual network, the means including:
- means for assigning a network address to the device, the network address selected from a plurality of network addresses that can be assigned to any of a plurality of virtual networks;
- means for authorizing the device to be included in each of the plurality of virtual networks, wherein the device is configured to maintain the assigned network address when the device is included in any one of the plurality of virtual networks;
- means for receiving a request to authenticate the device;
- means for determining a virtual network on which to assign the device, the virtual network selected from the plurality of virtual networks; and
- means for authenticating the device to be included in the assigned virtual network based on the request to authenticate.

33. A computerized device comprising:
- a memory;
- a processor;
- a communications interface;

an interconnection mechanism coupling the memory, the processor and the communications interface;

where the memory is encoded with an packet directing application that when executed on the processor configures the computerized device with a means for allowing a client to communicate using a virtual network, the means including:

means for detecting a first packet from the client, wherein the client includes an assigned network address associated with a plurality of virtual networks, and wherein the client is configured to maintain the assigned network address when the device is included in any one of the plurality of virtual networks;

means for identifying that the first packet is assigned to a first virtual network of a plurality of virtual networks operational in the data communications device;

means for assigning addressing information associated with the assigned network address of the first packet to routing information associated with the first virtual network; and means for routing the first packet and subsequent packets, each having the addressing information of the first packet, using the routing information associated with the first virtual network.

* * * * *